United States Patent [19]
Takada

[11] 4,206,641
[45] Jun. 10, 1980

[54] ELECTROMAGNETIC FLOW METER
[75] Inventor: Keisuke Takada, Kodaira, Japan
[73] Assignee: Tokyo Shibaura Electric Company, Limited, Tokyo, Japan
[21] Appl. No.: 923,685
[22] Filed: Jul. 11, 1978
[30] Foreign Application Priority Data
Aug. 10, 1977 [JP] Japan .................................. 52-95719
[51] Int. Cl.² .............................................. G01F 1/60
[52] U.S. Cl. .............................................. 73/194 EM
[58] Field of Search ................................... 73/194 EM
[56] References Cited
U.S. PATENT DOCUMENTS

| | | | |
|---|---|---|---|
| 3,329,018 | 7/1967 | Hognestad | 73/194 EM |
| 3,751,980 | 8/1973 | Fryer | 73/194 EM |
| 3,943,765 | 3/1976 | Takada et al. | 73/194 EM |

FOREIGN PATENT DOCUMENTS

| | | |
|---|---|---|
| 2410407 | 9/1976 | Fed. Rep. of Germany . |
| 3929490 | 6/1963 | Japan . |
| 4868268 | 9/1973 | Japan . |
| 4974565 | 7/1974 | Japan . |
| 108602 | 5/1966 | Norway . |
| 540143 | 7/1977 | U.S.S.R. .............................. 73/194 EM |

OTHER PUBLICATIONS

"Automatic Supply Voltage and Frequency Compensator for Magnetic Flow Meter," Research Disclosure, No. 136, pp. 52-53, Aug. 1975.

Primary Examiner—Charles A. Ruehl
Attorney, Agent, or Firm—Oblon, Fisher, Spivak, McClelland & Maier

[57] ABSTRACT

An electromagnetic flow meter for measuring the flow rate of a fluid, having a flow rate detector excited by a square wave exciting current, an AC amplifier for amplifying the output of the flow rate detector, a pulse width modulation circuit for converting the output of the AC amplifier into a pulse having a pulse width proportional to the amplitude of the output of the AC amplifier, and a circuit for measuring the pulse width of the output pulse of the pulse width modulation circuit. Since the pulse width of this output pulse is proportional to the flow rate, the flow rate of the fluid is determined by measuring the pulse width.

7 Claims, 3 Drawing Figures

ELECTROMAGNETIC FLOW METER

BACKGROUND OF THE INVENTION

1. Field of the Invention

This invention relates to electromagnetic flow meters, and more particularly to an electromagnetic flow meter in which pulse width modulation is employed to improve measurement accuracy.

2. Description of the Prior Art

Conventional electromagnetic flow meters employ a DC excitement system in which the exciting coil of a flow rate detector is excited by DC current, or an AC excitement system in which the exciting coil of a flow rate detector is excited by AC current.

In each of the two systems, a magnetic field is formed perpendicular to the direction of the flow of a fluid to be measured. An electromotive force is then induced by the fluid flow in a direction perpendicular to both the direction of the fluid flow and the direction of the magnetic field. The induced electromotive force is detected by an electrode, and the flow rate of the fluid is thereby measured in proportion to the electromotive force.

However, the former DC excitement system is disadvantageous in that electrode polarization is caused by electrolytic components included in the fluid to be measured, which affects the flow rate measurement, and also it is difficult to amplify a very low DC voltage.

On the other hand, the latter AC excitement system is relatively advantageous since the flow rate detector is then not affected by polarization occurring around the electrode, and the signal can be readily amplified. However, this system is still disadvantageous in that the flow rate measurement involves errors because 90°-shifted noise is caused by transformer action regardless of the flow rate, and in addition in-phase noise is caused by the eddy current of an iron core.

In order to eliminate the above-described difficulties accompanying the conventional flow meter, an electromagnetic flow meter employing square wave current to carry out the excitement has been proposed.

In general, in this electromagnetic flow meter, the exciting coil of the flow rate detector is energized by square wave current, and the instantaneous value of the voltage induced by energizing the exciting coil is sampled and held in order to convert the induced voltage into an electrical signal proportional to the flow rate.

However, this excitement system utilizing square wave current is disadvantageous in that if a noise pulse is superposed on the induced voltage at the time of sampling, the flow rate measurement value including this noise is obtained, and therefore the resultant flow rate measurement value is greatly deviated from the true value.

SUMMARY OF THE INVENTION

Accordingly, a primary object of the invention is to provide an electromagnetic flow meter in which the excitement is scarcely affected by noise, in principle.

Another object of the invention is to provide an electromagnetic flow meter in which the operating ranges of an indicator can easily be carried out.

A further object of the invention is to provide an electromagnetic flow meter which is hardly affected by external noise and is therefore high in measurement accuracy.

A still further object of the invention is to provide an electromagnetic flow meter in which digital indication of the flow rate can be readily carried out.

The foregoing objects and other objects of the invention have been achieved by the provision of an electromagnetic flow meter provided with a flow rate detector excited by an exciting current in the form of a square wave, for measuring the flow rate of a fluid, which, according to the invention, comprises an AC amplifier for amplifying the output of the flow rate detector, a pulse width modulation circuit for converting the output of the AC amplifier into a pulse having a pulse width proportional to the amplitude of the output of the AC amplifier, and a measurement circuit for measuring the pulse width of the output pulse of the pulse width modulation circuit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
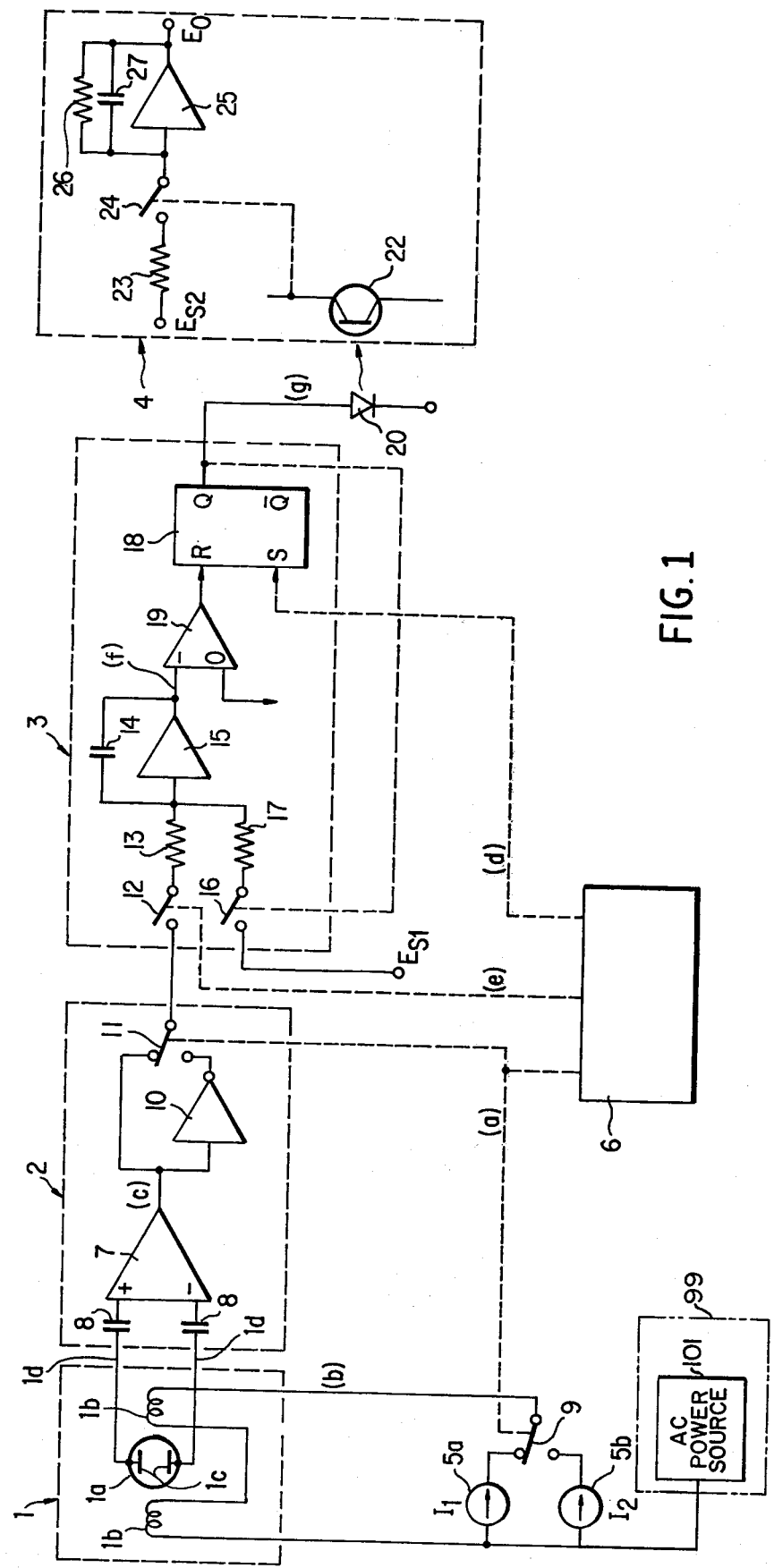
FIG. 1 is a block diagram illustrating one example of an electromagnetic flow meter according to this invention.

Referring now to the drawings, wherein like reference numerals designate identical or corresponding parts throughout the several views, and more particularly to FIG. 1 thereof, a first example of an electromagnetic flow meter according to this invention is seen to include a flow rate detector 1. A voltage proportional to the flow rate of fluid to be measured, induced in the flow rate detector 1 is amplified by an AC amplifier 2. A pulse having a pulse width proportional to the amplitude of the output of the amplifier 2 is provided by a pulse modulation circuit 3. The pulse width of the pulse is converted into a voltage by a pulse-width to voltage converter circuit 4, thereby to obtain a flow rate signal proportional to the flow rate of a fluid to be measured. Constant current sources 5a and 5b are provided to excite the flow rate detector 1 with a square wave current. These constant current sources are supplied with the alternating current by the AC power supply 99 which includes an AC power source 101, and produce the constant current. These sources function as an exciting source. Furthermore, a conventional timing control circuit 6 is provided to control various sections in the flow meter as described later.

In the flow rate detector 1, an exciting coil 1b is provided around a pipe 1a through which the fluid flows, and electrodes 1c are disposed in the pipe 1a to pick up a voltage induced according to the flow rate in the pipe 1a. The electrodes 1c are connected to first ends of lead wires 1d, the second ends of which are connected through capacitors 8 to the input terminals of the amplifier 7, respectively. The amplifier 7 is an operational amplifier.

A current is supplied to the exciting coil 1b of the flow rate detector 1 from the constant current source 5a or 5b. The constant current sources 5a and 5b supply currents different in value. In other words, the constant current sources 5a and 5b supply a current $I_1$ having a current value $I_1$ and a current $I_2$ having a current value $I_2$ to the exciting coil 1b, respectively. The currents $I_1$ and $I_2$ are selectively applied to the exciting coil 1b by means of a change-over switch 9. In this example, the current $I_1$ is larger than the current $I_2$. The change-over switch 9 is switched with a period $T_0$ with the aid of a switching signal a generated by the timing control circuit 6, as a result of which the currents $I_1$ and $I_2$ are allowed to periodically, or alternately, flow in the exciting coil 1b. In this example, the circuitry is so designed that the currents $I_1$ and $I_2$ flow for the same period of time. As the inductance of the exciting coil 1b is high, the currents applied to the exciting coil 1b from the constant current sources 5a and 5b by means of the change-over switch 9 are not abruptly changed, that is, they are gradually changed.

The induced voltage applied through the coupling capacitors 8 to an amplifier 7 in the AC amplifier 2 is amplified by the amplifier 7, the output of which is applied to an inversion amplifier 10 formed of an operational amplifier and to the pulse width modulation circuit 3 through one contact of a changeover switch 11. That is, the output of the amplifier is applied directly to the pulse width modulation circuit 3 or it is applied through the amplifier 10 to the pulse width modulation circuit 3 by operating the change-over switch 11. The change-over switches 9 and 11 are operated according to the switching signal a of the timing control circuit 6. More specifically, when the current $I_1$ from the constant current source 5a is applied to the exciting coil 1b through the change-over switch 9, the output of the amplifier 7 is applied directly to the pulse width modulation circuit 3 by means of the change-over switch 11, on the other hand, when the current $I_2$ from the constant current source 5b is applied to the exciting coil 1b through the change-over switch 9, the output of the amplifier 7 is applied through the inversion amplifier 10 to the pulse width modulation circuit 3 by means of the change-over switch 11. That is, a positive half wave of the output signal C of the amplifier 7 is applied directly to the pulse width modulation circuit 3 while a negative half wave of the output signal of the amplifier 7 is applied through the inversion amplifier 10 to the pulse width modulation circuit 3.

In the pulse width modulation circuit 3, the output of the AC amplifier 2 is applied through a switch 12 and a resistor 13 to an integration amplifier 15 having a capacitor 14. A negative reference voltage $-E_{s1}$ is applied to the input terminal of the integration amplifier 15 through a switch 16 and a resistor 17. The switch 12 is so controlled by a switching signal e generated by the timing control circuit 6 that it is closed only for a predetermined period of time $T_1$ during a stable period after the transient period of the output signal C of the AC amplifier circuit 2 has passed. That is, the switch 12 is closed when the switching signal e of the timing control circuit 6 is raised to a logical level "1"; on the other hand, it is opened when the switching signal e is lowered to a logical level "0".

The zero point detection of the integration amplifier 15 is detected by a comparator 19 comprising an operational amplifier. That is, when the output of the integration amplifier 15 is switched from "positive" to "negative", the comparator 19 operates to provide its output which is applied to the reset terminal R of a flip-flop 18.

Upon application of a set input signal, the output of the flip-flop 18 provided at its output terminal Q (hereinafter referred to as the output Q, when applicable) is raised to the "1" level; on the other hand, upon application a reset input signal, the output of the flip-flop 18 provided at its output terminal Q (hereinafter referred to as the output Q, when applicable) is changed to the "1" level. This state is maintained unchanged until an input signal is applied to the set input terminal or the reset input terminal. Therefore, when the output of the comparator 19 is applied to the reset input terminal R of the flip-flop 18, the level of the output Q is switched to the "0" level.

A switching signal d provided by the timing control circuit 6 is applied to the set input terminal S of the flip-flop 18. The switching signal d is produced when the switching signal e for operating the switch 12 has decayed, as a result of which the output Q of the flip-flop 18 is changed to the "1" level. This output Q is the output of the pulse width modulation circuit 3, and serves to close the switch 16 as it is at the "1" level as described above. That is, the switch 16 is closed when the output Q of the flip-flop 18 is at the "1" level. A light emission diode 20 is connected to the output terminal Q of the flip-flop 18 in the forward direction. When the output Q of the flip-flop 18 is raised to the "1" level, the light emission diode 20 emits light. The light thus emitted is received by a phototransistor 22, as a result of which the phototransistor 22 is rendered conductive thereby to close a switch 24 in the pulsewidth to voltage converter circuit 4.

In the pulse-width to voltage converter circuit 4, a reference voltage $E_{s2}$ is applied through a resistor 23 and a switch 24 to an amplifier 25 comprising an operational amplifier. The pulse-width to voltage converter circuit 4 operates to convert the pulse width of the output pulse of the modulation circuit 3 into a DC voltage proportional thereto, thereby to obtain a DC voltage proportional to the flow rate. A resistor 26 and a capacitor 27 are connected in parallel to the amplifier 25, and these components 26 and 27 function as a kind of smoothing circuit. The switch 24 is operated by the collector voltage of the photo-transistor 22, and a DC voltage $E_0$ proportional to the pulse width applied to the amplifier 25 is produced at the output of the converter circuit 4.

Figure 2:
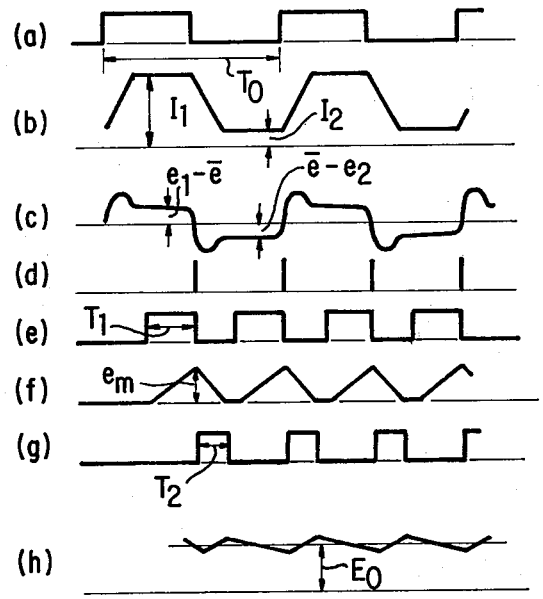
FIG. 2 is a waveform diagram for a description of the operation of the electromagnetic flow meter.

The timing control circuit 6 is a conventional control circuit which comprises a pulse generating circuit for generating clock pulses, a circuit which receives the clock pulse to output the switching signal a (as indicated by (a) in FIG. 2) with the predetermined period $T_0$, a circuit which receives the clock pulse thereby to output the switching signal e with the pulse width $T_1$ after the lapse of the transient time, and a circuit for outputting the set input pulse, namely, the switching signal d after the switching signal e has decayed (as the period of time required for the induced voltage to become stable through experience and experiment).

Now, the operation of the electromagnetic flow meter according to the invention will be described.

The current, as indicated by (b) in FIG. 2, is allowed to flow in the exciting coil 1b by operating the switch 9 with the aid of the switching signal a generated by the timing control circuit 6. In this case, even if the constant current source 5a is switched to the constant current source 5b, the current cannot be immediately changed from the current value $I_1$ to the current value $I_2$, that is, the current is gradually changed at the switching time as the inductance of the exciting coil is high. Voltages are induced in the electrode 1c in proportion to the flow rate by the magnetic field generated by the current. The induced voltages are applied through the coupling capacitors 8 to the amplifier 7, where they are subjected to AC amplification. The output waveform of the amplifier 7 is as indicated by (c) in FIG. 2. The output of the amplifier 7 has a waveform which has as its fundamental wave trapezoid waves which, when the average value e of the output voltage $e_1$ of the detector 1 in the case of the exciting current $I_1$ and the output voltage $e_2$ of the detector 1 in the case of the exciting current $I_2$ is assumed as the zero point, are created on both sides of the zero point. However, it should be noted that the waveform is such that the beginning part of each half wave where the polarity is changed is transiently overshot. In addition, as the operations of the change-over switches 9 and 11 are controlled by the switching signal a, the output of the AC amplifier 2, that is, the induced voltage as indicated by (c) in FIG. 2 has a waveform in the form of the absolute value, that is, a rectified waveform, for each negative wave thereof.

The output of the AC amplifier 2 is applied through the switch 12 to the integration amplifier. The switch 12 is closed only for the period of time corresponding to the pulse width $T_1$ with the aid of the switching signal e. Therefore, during the period $T_1$, the output f of the integration amplifier 15 is raised linearly to a voltage $e_m$, and the integrated output of the amplifier 15 is indicated by (f) in FIG. 2. When the switching signal e is decayed, the switching pulse d as indicated by (d) in FIG. 2 is applied to the set input terminal S of the flip-flop 18 from the timing control circuit 6, as a result of which the output Q of the latter 6 is raised to the "1" level and thereby closes the switch 16. At this time, the switch 12 is opened because no switching signal e is applied thereto. As a result, the output of the amplifier 15 is linearly decayed from $e_m$ to 0 as indicated by (f) in FIG. 2. When the output of the amplifier 15 reaches zero (0), an output pulse is applied to the reset input terminal R of the flip-flop 18 by the comparator 19, as a result of which the output Q of the flip-flop 18 is switched to the "0" level thereby to open the switch 16.

The output Q of the flip-flop 18 is maintained at the "1" level for the period of time during which the switch 16 is closed, that is, for the period of time during which the output voltage of the integration amplifier 15 is decreased to zero from the value $e_m$. During this period, the light emission diode emits light. Indicated by (g) in FIG. 2 is the waveform of the output Q. Furthermore, during the same period, the photo-transistor is rendered conductive, as a result of which the switch 24 is closed and the reference voltage $E_{s2}$ is therefore applied to the amplifier 25. The reference voltage $E_{s2}$ is formed into a pulse input signal to the amplifier 25 by the operation of the switch 24, and this pulse input signal is smoothed by the capacitor 27 and the resistor 26 into an output voltage $E_0$.

The output voltage $E_0$ is in proportion to the velocity u of the fluid to be measured. The flow rate measurement utilizing the operations of the switches 12 and 16 is carried out for every half wave period of the AC amplifier 2.

The output time $T_2$ of the pulse width modulation circuit 3 can therefore be expressed by the following equation:

$$T_2 = (e/E_{s1})T_1$$

As the voltage e is proportional to the input voltage of the modulation circuit 3, that is, the output of the detector 1, the pulse width output $T_{21}$ obtained when the exciting current $I_1$ is applied, and the pulse width output $T_{22}$ obtained when the exciting current $I_2$ is applied can be expressed by the following equations, respectively:

$$T_{21} = K_1 \frac{T_1}{E_{s1}} (e_1 - \bar{e})$$

$$T_{22} = K_1 \frac{T_1}{E_{s1}} (\bar{e} - e_2)$$

where $k_1$ is a constant, and $\bar{e}$ is the average value of $e_1$ and $e_2$.

In addition, since $e_1 \propto I_1 u$, and $e_2 \propto I_2 u$, $$T_{21} + T_{22} = K_1 \frac{T_1}{E_{s1}} (e_1 - e_2) = K_2 \frac{T_1}{E_{s1}} (I_1 - I_2) \mu$$

where u is the velocity of a fluid to be measured, and $K_2$ is a constant.

In the case where the switch 24 is opened and closed in response to the outputs of the flip-flop 18, the output of the pulse-width to voltage converter circuit 4 can be represented by the following equation:

$$E_0 = K_3 \frac{T_{21} + T_{22}}{T_o} E_{s2}$$

$$= K_4 \frac{E_{s2} \cdot T_1}{E_{s1} T_o} (I_1 - I_2) \mu$$

where $k_3$ and $K_4$ are constants.

Thus, the voltage $E_0$ is proportional to the velocity u, and therefore the velocity of a fluid can be obtained from this voltage $E_0$, and accordingly the flow rate of the fluid can be determined therefrom.

Accordingly to the above-described embodiment of the invention, in the pulse width modulation circuit, the output of the detector is integrated during the stable period, and during the transient period provided when the exciting currents are switched the output of the detector is not applied to the pulse width modulation circuit, and therefore the transient period can be utilized for integrating the reference voltage signal. Thus, each half wave period can be effectively utilized, which leads to an improvement of signal conversion efficiency. Furthermore, the electromagnetic flow meter, employing the integration system, is scarcely affected by noise, and therefore the measurement accuracy of the electromagnetic flow meter according to the invention is much higher than that of the conventional one. In addition, the measurement range can be changed with a simple circuitry by changing the integration time $T_1$. For instance, the measurement range can readily be changed in such a manner that an indicator which is full-scaled at a flow rate of 100 m$^3$ is modified so as to be full-scaled at a flow rate of 200 m$^3$.

In the above-described embodiment, the excitation is effected by application of the exciting currents $I_1$ and $I_2$, and the voltages induced by the two exciting currents are subjected to pulse width modulation. However, a system may be employed in which the pulse width modulation is suspended for the period of the signal based on the exciting current $I_2$, that is, the period $T_{22}$, and the pulse width modulation is carried out only for the period $T_{21}$ of the signal based on the exciting current $I_1$. If this system is employed, the inversion amplifier 10 shown in FIG. 1 can be eliminated.

It is obvious that the same effect as that described above can be obtained by employing an absolute value output type amplifier instead of the inversion amplifier 10 and the changeover switch 11.

In the above-described embodiment, the exciting currents $I_1$ and $I_2$ having the same polarity but different in current value are allowed to flow; however, it should be noted that the invention is not limited thereto or thereby. For instance, the current $I_2$ may be zero or may be different in polarity from the other current $I_1$. In the case where the currents $I_1$ and $I_2$ different in polarity are employed, the absolute value of one of the currents may be different from or equal to the other. At any rate, the absolute value $I_1 - I_2$ acts effectively on the pulse width modulation, and accordingly the polarity and absolute value of each of the currents can be determined as desired.

Furthermore, if the input integration time $T_1$ of the double integration circuit in the pulse width modulation circuit is set to be equal to or an integer multiple of the period of the AC power supply when the constant current sources are provided with the alternating current by the AC power supply, the induction noise due to the AC power supply can be minimized.

In addition, even if the frequency of the AC power supply is superposed on the induced voltage because of the long lead wires 1d, it can be cancelled because the double integration type integration circuit is employed. Furthermore, as optical coupling is utilized, the electromagnetic flow meter is scarcely affected by the noise.

Figure 3:
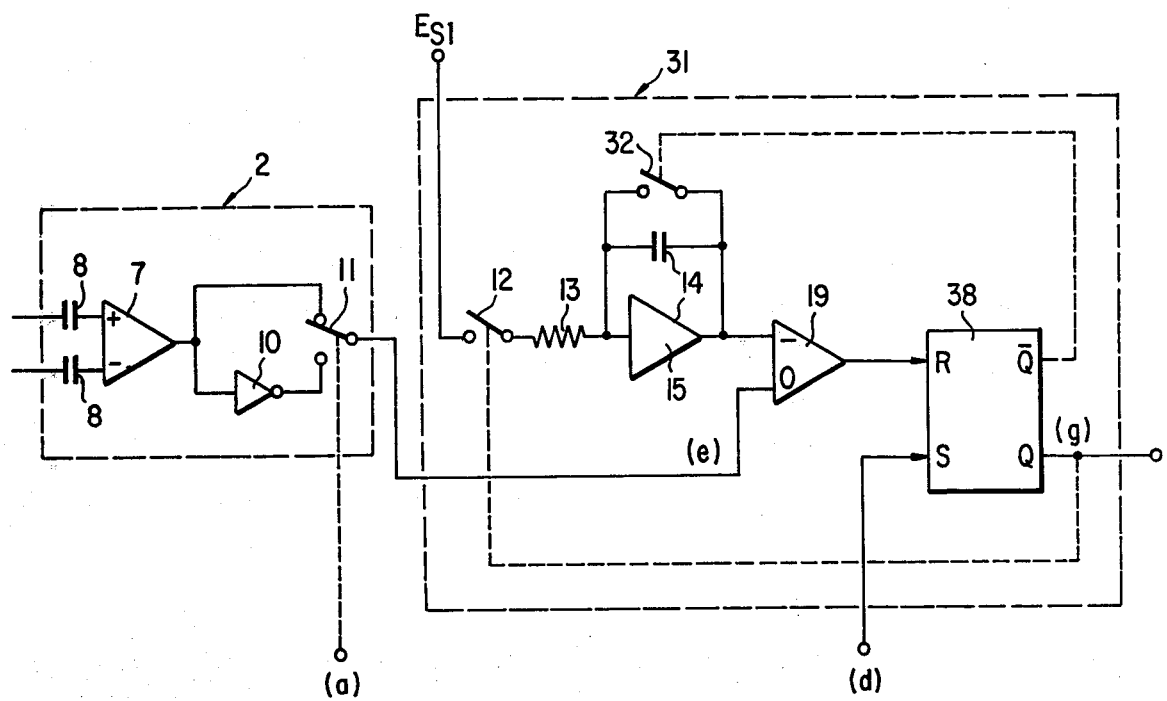
FIG. 3 is a block diagram showing another example of the electromagnetic flow meter according to the invention.

Another example of the electromagnetic flow meter according to the invention is shown in FIG. 3. In this example, its pulse width modulation circuit is formed as indicated by reference numeral 31 in FIG. 3. In the example shown in FIG. 1, the double integration circuit type pulse width modulation circuit is employed; however, an ordinary integration circuit may be employed instead of it. In FIG. 3, those components of the pulse width modulation circuit which have been described with reference to FIG. 1 are therefore designated by the same reference characters.

The output of the AC amplifier 2 is applied to one input terminal of the comparator 19. The reference voltage $E_{s1}$ is applied through the switch 12 and the resistor 13 to the integration amplifier 15. A switch 32 is connected in parallel to the capacitor 14 which is also connected in parallel to the amplifier 15, the output of which is applied to the other input terminal of the comparator 19.

A flip-flop 38 having an output terminal $\overline{Q}$ is connected to the comparator 19. The switch 12 is operated by the output $\overline{Q}$ of the flip-flop 38, while the switch 32 is operated by the output Q of the flip-flop 38, in such a manner that when the switch 12 is closed, the switch 32 is opened.

When the switching signal d as indicated by (d) in FIG. 2 is applied to the set input terminal S of the flip-flop 38, the output Q and the output $\overline{Q}$ of the latter 38 are switched to the "1" level and the "0" level, respectively, as a result of which the switch 12 is closed, while the switch 32 is opened. Thus, the reference voltage $E_{s1}$ is integrated by the integration amplifier 15, the output of which is applied to the comparator 19. The output of the AC amplifier 2 is applied to the comparator 19, in this case. These two inputs are compared with each other in the comparator 19. When the two inputs coincide with each other, a pulse is applied from the comparator 19 to the reset input terminal R of the flip-flop 38, as a result of which the output $\overline{Q}$ of the latter 38 is raised to the "1" level to close the switch 32 and to open the switch 12. Therefore, the integration capacitor 14 is discharged to be ready for the next charge. The output Q of the flip-flop 38 is transmitted through the light emission diode 20 to the pulse-width to voltage converter circuit 4, similarly as in the case of FIG. 1.

In the example shown in FIG. 3, it it is assumed that the steady-state voltage of the AC amplifier 2 is represented by e, the resistance of the resistor 13 is represented by R, and the capacitance of the capacitor 14 is represented by C, then the "on" operation time $T_2$ of the switch 12 can be expressed by the following equation:

$$T_2 = RC(e/E_{s1})$$

On the other hand, $$T_{21} + T_{22} = k(RC/E_{s1})(I_1 - I_2)u$$

Thus, $(T_{21} + T_{22})$ is proportional to the velocity of a fluid.

Therefore, the flow rate can be measured without using the double integration type pulse width modulation circuit.

In the example shown in FIGS. 1 and 3, the pulse-width to voltage converter circuit 4 is employed; however, it is not always necessary for achieving the measurement. That is, the measurement can be accomplished by employing a method in which the output Q of the flip-flop 18 (38) is applied to one input terminal of an AND circuit while a clock pulse is applied to the other input terminal of the AND circuit, and the AND output of both inputs is applied to a counter. As the AND output is the clock pulse which passes through the AND circuit while the output Q is at the "1", the flow rate can be measured by counting this clock pulse. Accordingly, digital indication of the flow rate can readily be carried out.

The reference voltage $E_{s1}$ of the pulse width modulation circuit may be provided as an independent voltage source; however, the exciting power supply may be utilized for the reference voltage.

As is apparent from the above description, according to the invention, the electromagnetic flow meter is scarcely affected by noises such as for instance induction noise, in principle. Accordingly, its measurement accuracy can be considerably improved. Furthermore, the flow meter according to the invention advantageously enables the fact that the measurement range can be readily established and digital process can readily be carried out.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An electromagnetic flow meter having a flow rate detector excited by a square wave exciting current produced by a power supply, for measuring the flow rate of a fluid, which comprises:
   an AC amplifier for amplifying the output of said flow rate detector;
   pulse width modulation means for integrating the amplified output of said flow rate detector from an output of the AC amplifier during a time period when transients produced by said square wave exciting current have substantially subsided and for converting the integrated output of said AC amplifier into a pulse output having a pulse width proportional to the amplitude of the output of said AC amplifier, said pulse width modulation means comprising a double integration circuit having an input integration time constant selected such that the pulse output of said pulse width modulation means is provided during the period of time when the output of said flow rate detector is transiently varied; and
   measurement means for measuring the pulse width of the output pulse of said pulse width modulation means.

2. An electromagnetic flow meter as claimed in claim 1, wherein said AC amplifier is of an absolute value amplifier type.

3. An electromagnetic flow meter as claimed in claim 1, wherein said pulse width modulation means comprises:
   inverter means connected to said AC amplifier for inverting the polarity of the output of said AC amplifier when said AC amplifier output is of a selected polarity.

4. An electromagnetic flow meter as claimed in claim 1, wherein said pulse width modulation means operates only for the period during which said exciting current has one of two polarities.

5. An electromagnetic flow meter as claimed in claim 1, wherein said measurement means establishes a flow rate measurement range which is changed by changing the input integration time constant of said pulse width modulation means.

6. An electromagnetic flow meter as claimed in claim 1, wherein said power supply includes an AC power source and the input integration time constant of said pulse width modulation means is set to an integer multiple of the frequency of said AC power source.

7. An electromagnetic flow meter as claimed in claim 1, wherein a reference voltage of said power supply for said exciting current is in common with a reference voltage of said pulse width modulation means.

* * * * *